United States Patent
Noh et al.

(10) Patent No.: US 9,631,747 B2
(45) Date of Patent: Apr. 25, 2017

(54) PARTIALLY CARBONITRIDING HEAT TREATED STAINLESS STEEL FERRULE AND MANUFACTURING METHOD THEREOF

(71) Applicants: DK-LOK CORPORATION, Gimhae, Gyeongsangnam-Do (KR); Sam Rae Jung, Busan (KR)

(72) Inventors: Eun Sik Noh, Busan (KR); Sam Rae Jung, Busan (KR)

(73) Assignee: DK-LOK CORPORATION, Gimhae, Gyeongsangnam-Do (KR)

( * ) Notice: Subject to any disclaimer, the term of this patent is extended or adjusted under 35 U.S.C. 154(b) by 429 days.

(21) Appl. No.: 14/514,998

(22) Filed: Oct. 15, 2014

(65) Prior Publication Data
US 2015/0107723 A1     Apr. 23, 2015

(30) Foreign Application Priority Data

| Oct. 22, 2013 | (KR) | 10-2013-0125871 |
| May 20, 2014 | (KR) | 10-2014-0060481 |
| Sep. 15, 2014 | (KR) | 10-2014-0122177 |

(51) Int. Cl.
| C23C 8/56 | (2006.01) |
| F16L 19/04 | (2006.01) |
| C23C 8/02 | (2006.01) |
| C23C 8/80 | (2006.01) |
| C23C 28/00 | (2006.01) |
| C25D 5/02 | (2006.01) |
| C25D 5/10 | (2006.01) |
| C25D 5/12 | (2006.01) |
| C25D 5/48 | (2006.01) |
| C25D 5/50 | (2006.01) |
| F16L 58/18 | (2006.01) |
| F16L 19/10 | (2006.01) |

(52) U.S. Cl.
CPC ............. *F16L 19/04* (2013.01); *C23C 8/02* (2013.01); *C23C 8/56* (2013.01); *C23C 8/80* (2013.01); *C23C 28/321* (2013.01); *C23C 28/322* (2013.01); *C23C 28/34* (2013.01); *C25D 5/02* (2013.01); *C25D 5/10* (2013.01); *C25D 5/12* (2013.01); *C25D 5/48* (2013.01); *C25D 5/50* (2013.01); *F16L 19/103* (2013.01); *F16L 58/184* (2013.01)

(58) Field of Classification Search
CPC .................................. C23C 8/56; C23C 8/32
See application file for complete search history.

(56) References Cited

U.S. PATENT DOCUMENTS

2002/0037120 A1* 3/2002 Tanaka .................. C22C 38/44
384/492

* cited by examiner

*Primary Examiner* — Jessee Roe
(74) *Attorney, Agent, or Firm* — Locke Lord LLP; Christopher J. Capelli; Daniel J. Fiorello

(57) ABSTRACT

This invention relates to a partially carbonitriding heat treated stainless steel ferrule, having a first region with a first hardness and a second region with a second hardness, wherein the first region includes a nitrogen layer having a nitrogen concentration higher than a carbon concentration, and a carbon layer formed under the nitrogen layer and having a carbon concentration higher than a nitrogen concentration, so that the first hardness is greater than the second hardness. Thereby, partial heat treatment is effective at preventing rotational torque of the region, except for the portion to be heat treated, from increasing due to the total hardening.

8 Claims, 7 Drawing Sheets

PARTIALLY CARBONITRIDING HEAT TREATED STAINLESS STEEL FERRULE AND MANUFACTURING METHOD THEREOF

CROSS-REFERENCE TO RELATED APPLICATION

This application claims the benefit of Korean Patent Application Nos. 10-2013-0125871, filed on Oct. 22, 2013, 10-2014-0060481 filed on May 20, 2014 and 10-2014-0122177 filed on Sep. 15, 2014, which are hereby incorporated by reference in its entirety into this application.

BACKGROUND OF THE INVENTION

1. Technical Field

The present invention relates to a partially carbonitriding heat treated stainless steel ferrule, and more particularly, to a partially carbonitriding heat treated stainless steel ferrule, wherein the surface of a stainless steel ferrule is subjected to carbonitriding treatment, so that a multilayer structure is partially produced and corrosion resistance is maintained.

2. Description of the Related Art

Heat treatment is widely utilized to enhance surface hardness of a workpiece. A surface hardening method with regard to heat treatment includes a physical surface hardening method and a chemical surface hardening method. Nitriding or carburizing is a representative chemical surface hardening method, which causes the chemical component of a base metal to change to achieve surface hardening. In a typical chemical surface hardening method, heat treatment is performed by bringing a workpiece into contact with a gas or molten salt solution for carburizing or nitriding at high temperature to thus diffuse the carbon or nitrogen atoms to the surface of the workpiece. Thereby, the carburizing or nitriding process enables a compound layer having high hardness to be formed on the surface of the workpiece. It is known that in the carburizing or nitriding process, the transformation of the base metal is very low and wear resistance, corrosion resistance and thermal stability of the hardening layer are superior, compared to other surface hardening methods.

Salt bath heat treatment may be used to increase hardness of a metal having high corrosion resistance such as iron (stainless steel) containing chromium. A compound layer for increasing hardness is typically provided via formation of a nitride precipitate or a carbide precipitate abbreviated to "nitride" or "carbide".

As such, a carbide ($Cr_3C_2$) is configured such that chromium is precipitated with respect to carbon. When a non-uniform surface structure is formed through precipitation in this way, a difference in electronegativity may occur between a portion where chromium is lacking due to removal of Cr and a portion where Cr is precipitated. Such a difference allows for action as a kind of galvanic cell, and thus a metal product may easily corrode. The precipitation easily takes place when the same element as in the precipitate is present in a large amount in the workpiece or it is easy to permeate particles due to high heat treatment temperature.

The case where the carbide is formed in a smaller amount on the surface of the workpiece is favorable but is difficult to control.

Also, a cyanide compound (HCN, KCN, etc.) for general use in carbonitriding is very harmful to the human body, and alternative materials thereto have to be found.

Although a workpiece needs to be totally hardened, a part such as a ferrule is required to have high hardness only on a portion thereof.

FIGS. 1A and 1B are a cross-sectional view and a perspective view, respectively, illustrating a ferrule having a predetermined shape used to connect two pipes.

FIG. 1A is a cross-sectional view illustrating the connection structure of two pipes using a ferrule.

When the two pipes, for example, a front pipe 11 and a rear pipe 15 are connected, the ferrule functions to close a gap between the front pipe 11 and the rear pipe 15 and is responsible for swaging the pipes to ensure a sealing function and for preventing separation of the pipes.

The ferrule may include a front ferrule 13 and a back ferrule 14.

The back ferrule 14 plays a role in that while the rear (tail portion 14a) of the back ferrule 14 is pushed by a nut 12 for tightening the pipes, a force is transferred to the front ferrule 13. As such, while the nut 12 rotates, it transfers the force to the ferrules to tighten the pipes, and thus rotational torque is created. The back ferrule 14 performs a linear motion in the travel direction of the nut 12 when the nut 12 is moved forward while rotating.

By the back ferrule 14, the lower beveled portion of the rear of the front ferrule 13 is lifted up, and a nose portion 14b swages the pipes to thereby prevent the separation of the pipes.

Accordingly, desired purposes may be achieved only when the hardness of the nose portion 14b of the back ferrule 14 is high. If the entire back ferrule 14 has high hardness, rotational torque of the nut 12 is not efficiently absorbed, thus increasing brittleness. Thus, only the nose portion 14b of the back ferrule 14 has to be selectively hardened.

FIG. 1B is a perspective view illustrating the ferrule. The ferrule is ring-shaped and the nose portion 14b thereof is transformed by a force applied to the front from the back. Hence, the nose portion 14b needs to be particularly hardened.

The back ferrule 13 includes a support portion 14a to which pressure is applied while the nut 12 is tightened, and a nose portion 14b which receives the applied pressure and thus undergoes irreversible transformation and closes and swages the edge of the pipe. As high friction and force are applied in the course of transformation, the nose portion 14b has to possess high hardness and elasticity. Accordingly, a part that selectively requires high hardness on a predetermined portion, such as the ferrule 14, should undergo selective partial hardening treatment.

If the entire back ferrule 14 is subjected to hardening treatment to create high hardness, irreversible transformation for swaging the pipes needs greater force, which results in that rotational torque on the nut 12 may further increase, undesirably incurring poor workability.

When high hardness is required only on a predetermined portion in this way, such a portion is hardened through partial heat treatment. Typically, a partial heat treatment method includes plating a workpiece with a different kind of metal, wherein the resulting plating is used as a mask against heat treatment. Specifically, the workpiece is plated with a different kind of metal, and the plating is removed from a portion to be hardened, so that the surface of the workpiece is externally exposed. Then, heat treatment is performed, and thereby the portion which is not externally exposed blocks the permeation of nitrogen or carbon due to the plating, and thus precipitation does not easily occur. Consequently, only the exposed portion is selectively hardened.

However, upon long-term heat treatment, chromium is precipitated on the portion which undergoes the heat treatment, remarkably deteriorating corrosion resistance, which is undesirable.

SUMMARY OF THE INVENTION

Therefore, an object of the present invention is to provide a partial heat treatment method, wherein the surface of a workpiece that is desired not to be heat treated is partially plated with a dense metal, such that permeation of the particles may be prevented during heat treatment, thereby preventing an increase in rotational torque due to the total hardening.

Another object of the present invention is to provide a carbonitriding process that adopts a molten salt solution, which is harmless to the human body and may continuously supply nitrogen and carbon during low-temperature heat treatment, thus ensuring process stability and reducing the manufacturing cost.

A further object of the present invention is to provide a stainless steel ferrule, in which corrosion resistance does not deteriorate even after a carbonitriding heat treatment process in a partial heat treatment method.

In order to accomplish the above objects, an aspect of the present invention provides a partially carbonitriding heat treated stainless steel ferrule, having a first region with a first hardness and a second region with a second hardness, wherein the first region includes a nitrogen layer having a nitrogen concentration higher than a carbon concentration and a carbon layer disposed under the nitrogen layer and having a carbon concentration higher than a nitrogen concentration, so that the first hardness is greater than the second hardness.

The first and the second region may further include a chromium-based oxide film on the surface thereof.

Also, the stainless steel ferrule further includes a surface layer formed on the nitrogen layer and containing nitrogen and carbon in amounts of greater than 1%, the thickness of the surface layer being 0.005 to 0.1 μm.

The thickness of the nitrogen layer may range from 0.1 μm to 10 μm, and the nitrogen concentration may become maximum on the surface.

As such, the carbon layer may be provided at a position deeper than 5 μm from the surface.

For the carbon layer, the carbon concentration may become maximum in the region of 5 to 15 μm from the surface.

The first hardness may be 600 to 800 hv and the second hardness may be a general hardness of stainless steel.

The first region may be a nose portion.

The stainless steel ferrule may be a back ferrule.

Another aspect of the present invention provides a method of manufacturing a partially carbonitriding heat treated stainless steel ferrule, including immersing a stainless steel ferrule, a second region of which is plated, in a molten salt solution containing a nitrogen-based organic material so as to be heat treated.

The molten salt solution may be a molten solution of an alkali salt containing a nitrogen and carbon compound, and the stainless steel ferrule may be heat treated by being immersed in the molten salt solution.

The nitrogen and carbon compound may be a heterocyclic organic compound comprising carbon and nitrogen.

The heterocyclic organic compound comprising carbon and nitrogen may be a purine-based compound.

The purine-based compound may be uric acid.

The second region may have hardness lower than hardness of the heat treated portion.

The hardness of the second region may be a general hardness of stainless steel and the heat treated portion may have a hardness of 600 to 800 hv.

According to an aspect of the present invention, particles can be prevented from permeating through a metal layer during heat treatment.

According to another aspect of the present invention, hardening of a plated portion can be prevented during heat treatment, thus prohibiting rotational torque applied to the entire workpiece from increasing.

According to still another aspect of the present invention, carbonitriding can be carried out using a molten salt solution which is harmless to the human body and is inexpensive, thereby ensuring process stability and reducing the manufacturing cost.

According to yet another aspect of the present invention, a ferrule has three hardening layers on the surface thereof, thus exhibiting both strength and corrosion resistance.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1A:
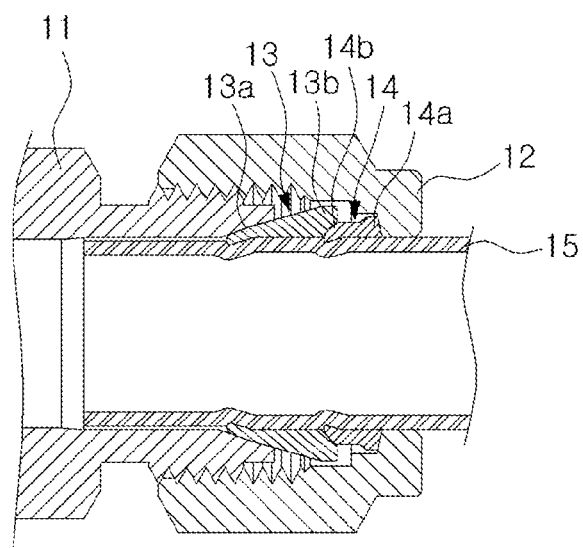
FIGS. 1A and 1B are a cross-sectional view and a perspective view, respectively, illustrating a ferrule having a predetermined shape used to connect two pipes.
Figure 1B:
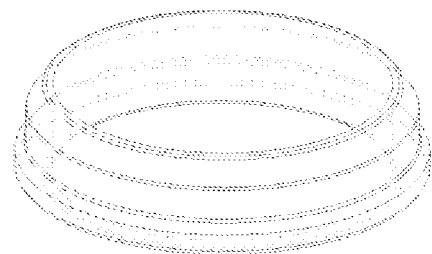

Hereinafter, a detailed description will be given of preferred embodiments of the present invention with reference to the appended drawings. Throughout the drawings, it is noted that the same reference numerals are used to refer to the same or similar elements. As such, the constructions and functions of the present invention depicted in the graphs and photographs of the drawings and described thereby may correspond to at least one embodiment, but are not construed as limiting the present invention.

In the present invention, a molten salt solution used for salt bath carbonitriding is regarded as important. Thus, the molten salt solution is first described and then a partially carbonitriding heat treated stainless steel ferrule and a manufacturing method thereof are described.

According to an embodiment of the present invention, a partially carbonitriding heat treated stainless steel ferrule is configured such that a portion of a stainless steel ferrule which is desired so as not to be heat treated is plated so that carburizing or nitriding does not occur, and the stainless steel ferrule is immersed in a molten salt solution containing a nitrogen-based organic material and thus carbonitrided. The stainless steel ferrule thus manufactured includes two regions having different hardness values, and the hardened region includes three heat treatment layers. Upon heating at medium and low temperature, the nitrogen-based organic material in the molten salt solution decomposes slowly. Also upon heating for a long period of time, the nitrogen and carbon ions produced in the course of decomposing the nitrogen-based organic material may penetrate so as to be sufficiently deep in the stainless steel ferrule. As such, the carbon ions may easily react with oxygen compared to the nitrogen ions, and thus may be removed from the salt. Carbon reacts only in the early stage in the course of the long-term salt bath.

In the early stage of salt bath heat treatment, both nitrogen and carbon react with the surface of metal, but carbon may rapidly penetrate to the surface of metal compared to nitrogen, and thus the penetration of carbon is predominant. However, from the mid stage of salt bath heat treatment, carbon is oxidized to air in the molten salt solution and thus removed. Therefore, only reaction of nitrogen takes place after the mid stage. Specifically, in place of carbon, nitrogen is predominantly present in the layer close to the surface of metal, and carbon is predominantly present in the deeper layer. Since there remains a compound produced with chromium while initially reacting carbon and nitrogen, a surface layer having a hardened surface is obtained.

Accordingly, a surface layer that is highly hardened due to the production of compounds of carbon and nitrogen with chromium and iron at high ratios, and a first region including a nitrogen layer formed under the surface layer and a carbon layer formed under the nitrogen layer may be sequentially provided from the surface of the workpiece, wherein the nitrogen layer has low carbon content and high nitrogen content to prevent hardness from becoming significantly different from the surface layer so as not to separate the surface layer, and the carbon layer has low nitrogen content and high carbon content to exhibit high toughness. These layers may be produced to a depth of maximum 40 μm, and the nitrogen layer and the carbon layer may contain nitrogen and carbon up to about 2%, respectively.

To produce the structure as above, the salt including carbon and nitrogen, which is added to the salt bath, is considered important.

Such a salt has to supply carbon and nitrogen at reaction temperature and also to be present in the molten salt solution at reaction temperature.

Accordingly, the salt should be stable at high temperature at which heat treatment is carried out, and should be able to easily supply carbon and nitrogen at about 500° C. which is a minimum temperature for currently available salt bath heat treatment.

Figure 2:
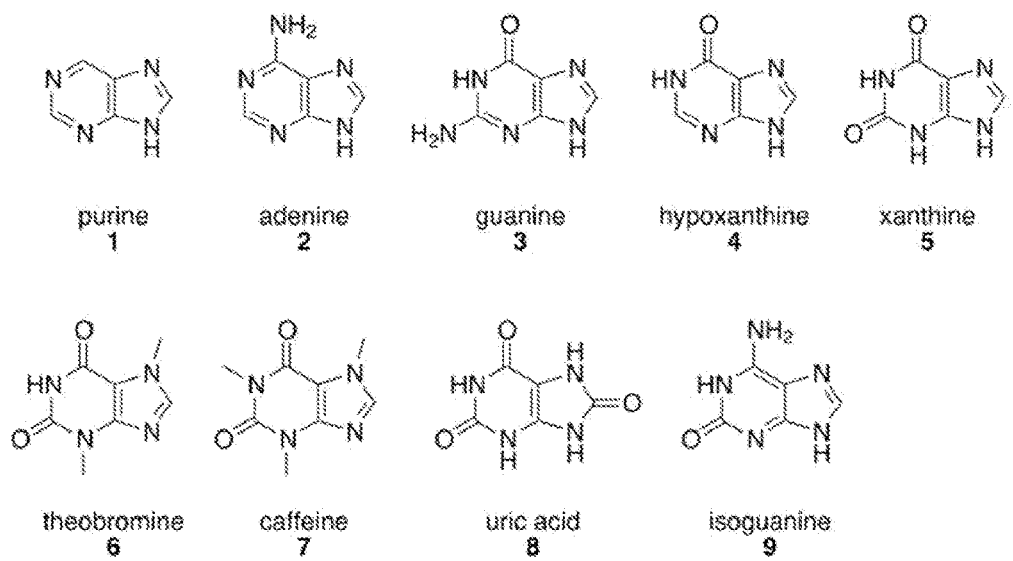
FIG. 2 is a view illustrating molecular structures of nitrogen-based organic materials, which may be added to a molten salt solution according to an embodiment of the present invention.

FIG. 2 illustrates the molecular structures of nitrogen-based organic materials, which may be added to the molten salt solution according to an embodiment of the present invention.

The illustrated materials are a purine-based compound. The purine-based compound is a heterocyclic material including two resonant bonding rings containing nitrogen. Resonant bonding is strong and is thus stable at high temperature. Further, this compound has comparatively high molecular weight and is a bonding structure containing nitrogen and oxygen and may thus be easily converted into an ionized structure. As for the purine-based compound having high molecular weight, when some elements thereof are substituted, an ionic bonding material may be formed and may thus have a melting temperature of about 300° C. but is difficult to evaporate. Therefore, when heat treatment is carried out for a long period of time at a temperature at which thermal decomposition begins in the presence of typical uric acid, nitrogen and carbon which are constituents of uric acid may be continuously supplied.

The stainless steel ferrule is subjected to salt bath heat treatment at low temperature for a long period of time. In the present invention, carbon and nitrogen may penetrate deeply. To this end, heat treatment is implemented for a long period of time of 24 hr or more. However, long-term heat treatment may cause recrystallization of chromium during the penetration of carbon. In this case, corrosion resistance may remarkably deteriorate due to precipitated chromium carbide. Furthermore, the molten salt solution in which the stainless steel ferrule is immersed for salt bath heat treatment includes a heterocyclic organic compound such as uric acid, which is structurally decomposed at high temperature. In order to allow all of the organic compound and the components of the organic compound to be present in the molten salt solution, the temperature at which the structure begins to decompose has to be maintained. Otherwise, the organic compound in the molten salt solution may be initially removed attributed to combustion. Among the heterocyclic organic compounds having different thermal decomposition temperatures, uric acid has a decomposition temperature of about 500° C. Accordingly, the temperature of the molten salt solution is kept at about 500° C., so that uric acid is controlled to thermally decompose at a low rate.

The molten salt solution may include an alkali salt, in addition to the organic compound as above. As stainless steel has a chromium oxide film on the surface thereof, the chromium oxide film should be removed or activated for heat treatment. Since an oxide film is reduced through the reaction with a molten alkali salt solution, the oxide film may be removed by immersion in a molten alkali salt solution. Particularly in an embodiment of the present invention, when uric acid is contained, an alkali metal ion may further function to adjust acidity of the molten salt solution.

The organic compound that decomposes at high temperature is slowly divided into carbon and nitrogen at 500° C. As such, carbon is combined with oxygen in air, giving carbon dioxide. Thus, carbon is removed from the molten salt solution. In the early stage at which the organic compound decomposes, nitrogen and carbon exist together, and then nitrogen is mainly present with a decrease in concentration of carbon.

Carbon and nitrogen are placed in the empty space at the same position of austenitic stainless steel. Thus, carbon is first penetrated when carbon is mainly placed, and then nitrogen is penetrated in coincidence with pushing carbon when nitrogen is mainly placed. As such, carbon is combined with oxygen produced by the decomposition of the organic compound and is thus precipitated, and the concentration of carbon in the portion close to the surface of the workpiece is rather lowered.

Due to such a difference in the concentration, the carbon concentration in the portion close to the surface of the workpiece decreases but nitrogen penetrates at high density.

On the other hand, nitrogen having low permeability does not penetrate deeply. Since nitrogen is located at the same position as in carbon, there occurs a competitive relation therebetween. During the permeation of nitrogen, carbon is pushed more deeply.

Carbon is temporarily supplied only in the early stage and then removed, and only nitrogen remains, so that low-temperature salt bath nitriding is maintained. Thus, precipitation of chromium due to carbon is limited, and the corrosion resistance is less deteriorated.

Figure 3:
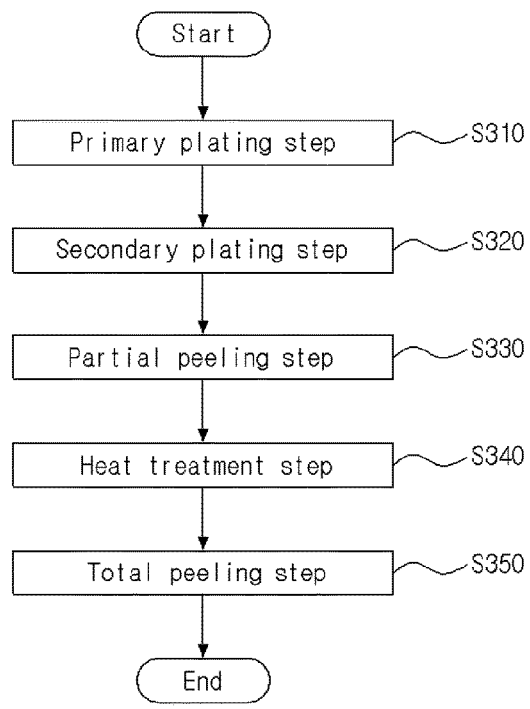
FIG. 3 is a flowchart illustrating processing of a workpiece according to an embodiment of the present invention.

FIG. 3 is a flowchart illustrating a process of manufacturing a partially carbonitriding heat treated back ferrule according to an embodiment of the present invention.

In the primary plating step (S310), the surface of a workpiece is plated with a first metal layer.

Any plating process may be applied, but electroplating is suitable because the plating region has to be free of voids.

The subsequent process includes peeling the plating. If any residue is left behind after peeling of the plating, the portion where the plating residue is present is not heat treated.

Thus, the first metal layer favorably includes a metal which may be peeled off without leaving any residue. Specifically, the metal for the first metal layer has to possess a different structure from a metal to be plated (a workpiece) so that no mutual penetration occurs at the boundary therebetween.

That is, a metal in which the boundary between the surface of the workpiece and the plated first metal layer is unclear is improper for use in the first metal layer.

Also, the first metal layer should have high penetration resistance so that it prevents penetration of carbon or nitrogen and may block carbon or nitrogen under high heat conditions. In an embodiment of the present invention, the plating metal is copper. The first metal layer made of copper is described below.

In addition to copper, a metal such as chromium, nickel or tin may be used for the first metal layer because it prevents penetration of carbon or nitrogen under high heat conditions and may be easily peeled from the workpiece. Also useful is an alloy thereof.

The thickness of the first metal layer favorably falls in the range from about 15 µm to within 50 µm. When the first metal layer is 15 µm thick, permeation of the penetration material may be prevented and uniform thickness may be maintained. On the other hand, when the first metal layer is 50 µm thick, the subsequent peeling process may be easily performed.

In the secondary plating step (S320), the surface of the first metal layer is plated with a second metal layer.

The second metal layer is denser than the first metal layer, so that the sparse portion (high energy portion) of the first metal layer is finely plated therewith. When the first metal layer is made of copper, the second metal layer may include any composition having a more compact and denser structure than copper. Specifically, a metal such as chromium, nickel, tin or iron may be used, or useful is an alloy of two or more thereof.

The first and the second metal layer are plated to a thickness of at least 15 µm so as to prevent permeation of the salt for a long period of time at high temperature.

Also, when the first and the second metal layer 410, 510 are peeled by immersing the workpiece in a solvent, the first and the second metal layer 410, 510 should be completely removed within a short peeling time period so that the workpiece is not damaged. Hence, the first and the second metal layer 410, 510 should be plated to be sufficiently thin (50 µm or less).

In the partial peeling step (S330), portions of the first and the second metal layer 410, 510 plated on the workpiece are peeled, thus partially exposing the surface of the workpiece. The preset region of the workpiece is a portion requiring high hardness. For the back ferrule 14, it may be a nose portion 14b that comes into close contact with the surface of a pipe through irreversible transformation.

Any peeling process may be employed so long as any residue is not left behind and only the metal layer is dissolved without damage to the workpiece.

By the immersion process in a solvent for dissolving the metal layer, the plating at a specific portion may be removed. When a solvent able to dissolve both of the two metal layers is provided, these layers may be removed simultaneously via the immersion process in the solvent. Also, when different kinds of solvents are provided to dissolve the two metal layers, an outer plating and an inner plating may be sequentially removed by being immersed in a solvent for dissolving the outer plating and then in a solvent for dissolving the inner plating. When the first metal layer includes copper, the solvent for dissolving the first metal layer may be nitric acid, and when the second metal layer includes chromium, the solvent for dissolving the second metal layer may be hydrochloric acid.

In the heat treatment step (S340), the workpiece is heat treated. This heat treatment process may be salt bath heat treatment. For the salt bath heat treatment, the workpiece is immersed in a molten salt solution at high temperature. Depending on the kind of molten salt solution, the component that penetrates into the surface of the workpiece during the heat treatment is determined.

The salt bath heat treatment may be carried out using a salt containing carbon or nitrogen. When salt bath heat treatment (carburizing) is performed using a salt containing carbon, carbon may penetrate to the workpiece and thus recrystallization occurs; and when salt bath heat treatment (nitriding) is conducted using a salt containing nitrogen, nitrogen may penetrate to the workpiece and thus recrystallization takes place. As such, the salt may include an alkali to increase surface reactivity of the workpiece.

As such, the depth of the component that penetrates to the surface of the workpiece and the penetration rate thereof are determined by the heat treatment temperature. When the heat treatment temperature is high, the penetration component may more rapidly and deeply penetrate into the surface of the workpiece.

However, when the heat treatment temperature is high, the component (i.e. chromium) contained in the workpiece is recrystallized, so that the workpiece is converted into a non-uniform structure. When the structure is converted in this way, non-uniformity may cause a difference in electronegativity to thus produce a kind of galvanic cell, remarkably deteriorating corrosion resistance, which is undesirable. Hence, the heat treatment is carried out not at high temperature but at low temperature for a long period of time, and thereby the penetration material is uniformly inserted to the inside of the workpiece, thus uniformly and rigidly modifying the surface structure. In this case, the deterioration of corrosion resistance is limited.

As such, the low temperature may fall in the range of 500 to 800° C. at which the precipitation is minimized, and the long period of time may be 15 hr or more from which the workpiece begins to be significantly hardened.

Because high temperature is applied to the entire workpiece, the penetration component may penetrate throughout the workpiece. However, the penetration component does not come into direct contact with the surface of the workpiece at the plated portion, and thus does not penetrate. That is, it is difficult to modify the surface of the workpiece through heat treatment.

Also, the molten salt solution may include a nitrogen-based organic material. The nitrogen-based organic material is a nitrogen and carbon compound, and thereby nitrogen and carbon may be supplied. The nitrogen and carbon compound may be a heterocyclic organic compound including carbon and nitrogen. The heterocyclic organic compound is stable because of resonant bonding and the cyclic structure thereof does not break even at high temperature. Particularly as the heterocyclic organic compound, a purine-based compound has a simple structure and satisfies symmetry and thus begins to decompose at a temperature near 500° C. Hence, the addition of a purine-based compound is preferable. The structure of the purine-based compound, which is efficiently ionized, such as uric acid, may be present as ions in the molten salt solution, making it difficult to perform gasification. Accordingly, even when uric acid is heated to high temperature, it may be left behind in the molten solution at low temperature. Therefore, heat treatment may be carried out without pressurization.

Depending on the amount of added organic compound and the heat treatment temperature, the residence time of carbon and nitrogen in the molten salt solution is determined. When the decomposition rate of the organic compound is decreased through heat treatment at lower temperature, carbon may reside longer and thus the carbon layer is thickly formed. Also, when the total heat treatment time is shortened, the carbon heat treatment is performed only in the early stage of heat treatment and the nitrogen heat treatment is carried out in the late stage, effectively lowering the thickness of the nitrogen layer. The thickness of the layer structure of the partially carbonitriding heat treated back ferrule, which is finally obtained, is determined by the concentration of the additive, the period of time required to further add the additive, and the heat treatment temperature and time.

Limitations are naturally imposed on the heat treatment temperature. When the initial heat treatment temperature is high, carbon penetrates under the condition that it is excessively produced. When an excess of carbon penetrates at high temperature, chromium is excessively precipitated, resulting in deteriorated corrosion resistance. Thus, heat treatment at a temperature higher than 800° C. is undesirable. In contrast, when heat treatment is carried out at a temperature lower than 500° C., uric acid does not efficiently decompose and thus heat treatment does not take place. Furthermore, there is no efficient penetration of nitrogen or carbon. Hence, heat treatment at a temperature lower than 500° C. is undesirable.

Such temperature limitations are closely related with the decomposition temperature of the organic material. When a heterocyclic organic compound, other than uric acid, is used, temperature limitations may become different. This is because the heterocyclic organic compound may decompose too fast or the decomposition initiation temperature thereof becomes different.

Even in the presence of the plated portion, when the metal layer is too thin or is not dense or the penetration component permeates into the metal layer due to the long-term heat treatment, penetration therethrough occurs and recrystallization is thus carried out, ultimately increasing rotational torque attributed to the total hardening. Upon salt bath heat treatment at low temperature for a long period of time, many kinds of plating metals may corrode and thus cannot shield the heat treatment.

The first metal layer 410 is secondarily plated with a dense layer to thus prevent permeation of the penetration component. In general, double plating with two layers having different structures is not performed because the plating thickness is not uniform.

However, when a secondary plating process is conducted to strengthen the portion where the first plating is not hard, there is no need to form a uniform plating thickness. The portion where the first plating is not hard is strengthened with the second plating, so that a total uniform electronegativity may result.

Accordingly, the first metal layer may include copper which is easily peeled, and the second metal layer may include a metal having a denser structure than the first metal layer, for example, any one or more selected from among iron, nickel, chromium and tin. The second metal layer preferably includes a metal or a metal alloy different from the first metal layer.

As such, heat treatment is not necessarily performed using only the immersion process in the salt. Depending on the kind of penetration material, it may be applied in the form of a gas or aerosol at high temperature on the surface of the workpiece. However, the salt bath heat treatment may cause uniform modification of the surface of the workpiece, resulting in a high-quality product. Also, heat treatment at low temperature enables the penetration material to slowly penetrate. Because nitrogen more rapidly penetrates into the surface than carbon, in an embodiment of the present invention, the salt bath heat treatment may be nitriding heat treatment. Although the nitriding heat treatment is performed under the condition that the partial pressure of nitrogen is high upon heat treatment, the immersion process in the molten salt solution containing nitrogen oxide or a nitrogen and carbon compound makes it possible to achieve more uniform and rapid hardening.

In the total peeling step (S350), the first and the second metal layer, which remain, are peeled off. As in the partial peeling step, the remaining metal layers may be peeled using the solvent. After completion of the peeling, whether the metal layers are left behind or not may be checked. Because corrosion resistance may deteriorate due to the hardening through heat treatment, when the chemical process is regarded as inappropriate, peeling may be performed by a physical process. Thus, it is possible to physically remove the metal layer using polishing.

The partial hardening process on the workpiece requiring partial hardening is as described above. With reference to FIGS. 4 to 8, when the workpiece is a ferrule, intermediate products and a final product at individual steps in the partial hardening process are described below.

Figure 4:
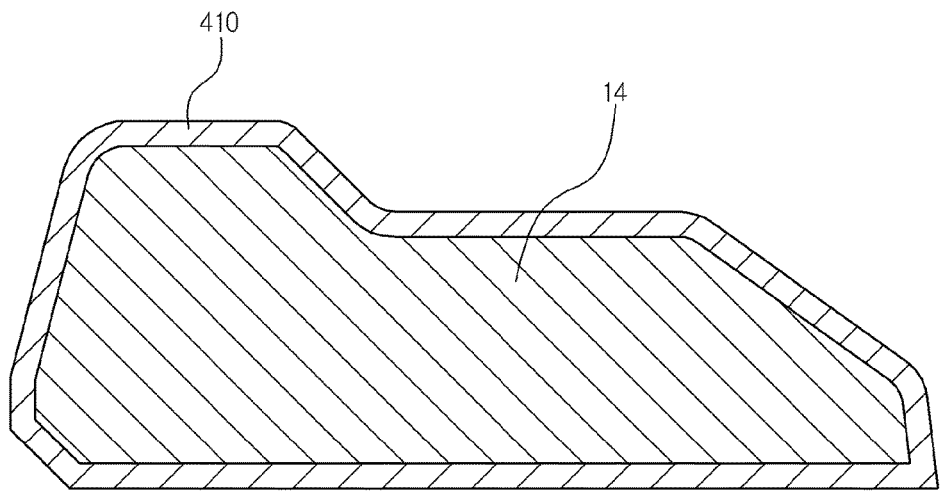
FIG. 4 is a cross-sectional view illustrating a primarily plated ferrule according to an embodiment of the present invention.

FIG. 4 is a cross-sectional view illustrating a primarily plated ferrule according to an embodiment of the present invention.

The back ferrule 14 includes a tail portion 14a for supporting the pressure of the rear thereof, and a nose portion 14b connected to the tail portion 14a and configured to seal the pipes through irreversible transformation by pressure applied from the tail portion 14a.

As mentioned above, the back ferrule 14 is a stainless steel ferrule containing chromium.

For selective heat treatment, it is difficult to plate the portion other than the nose portion 14b so as to expose only the nose portion 14b of the back ferrule 14. Therefore, the entire back ferrule 14 is first plated and then the portion corresponding to the nose portion 14b is selectively peeled. In the primary plating step, the entire back ferrule 14 is plated with the first metal layer. The first metal layer 410 is formed of an element different from the composition of the back ferrule 14 so as to be easily separated through chemical or physical treatment from the surface of the workpiece. For example, in the stainless steel back ferrule 14, the first metal layer 410 may include copper. The lower limit of the thickness of the first metal layer 410 may be 15 μm so that the surface of the back ferrule is thoroughly plated therewith and the back ferrule 14 is protected from an external material, whereas the upper limit thereof may be 50 μm so that no residue is left behind upon chemical peeling. The plating process may be electroplating, but any process may be used so long as the surface of the workpiece is thoroughly plated.

Figure 5:
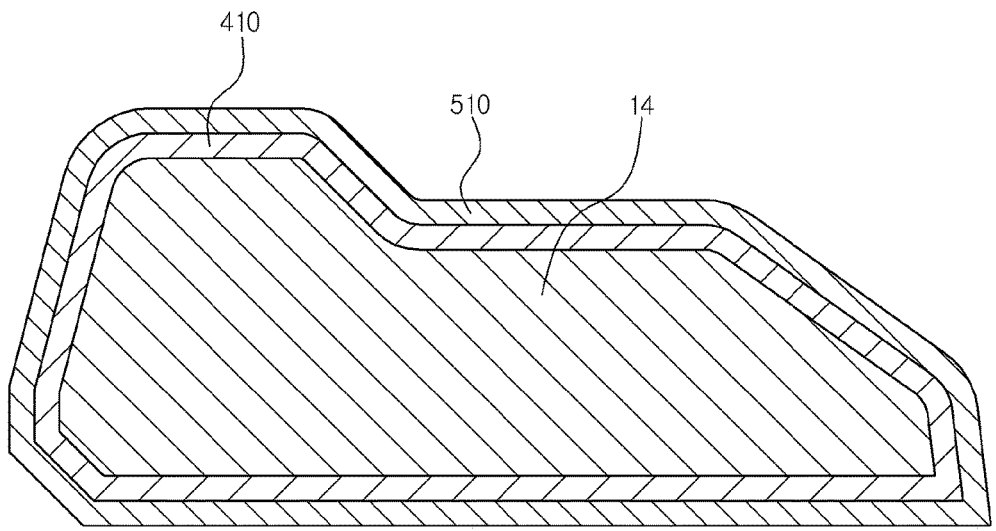
FIG. 5 is a cross-sectional view illustrating a secondarily plated ferrule according to an embodiment of the present invention.

FIG. 5 is a cross-sectional view illustrating a secondarily plated ferrule according to an embodiment of the present invention.

In the secondary plating step, the second metal layer 510 is plated on the first metal layer 410 formed in the primary plating step. When only the first metal layer 410 is provided, nitrogen and carbon may penetrate during the long-term heat treatment. Hence, the second metal layer 510 having a denser structure than the first metal layer 410 is secondarily plated. As the first 410 and the second metal layer 510 have different structure densities, it is difficult to achieve uniform plating. However, in an electroplating process, the second metal layer 510 is plated thickly on the portion where the first metal layer 410 is thinly plated and thus resistance is low. Therefore, the sparse portion of the first metal layer 410 may be strengthened with the second metal layer 510. To this end, non-uniform plating may be more suitable, rather than uniform plating. Although the electroplating process may be applied, any process may be utilized so long as the corresponding surface is thoroughly plated.

The second metal layer 510 may include iron, nickel, chromium, tin or an alloy thereof, which is dense and resistant to salt compared to copper. The lower limit of the thickness of the second metal layer 510 may be 15 μm so that the surface of the back ferrule is thoroughly plated therewith and the back ferrule 14 is protected from an external material, whereas the upper limit thereof may be 50 μm so that no reside is left behind upon chemical peeling.

Figure 6:
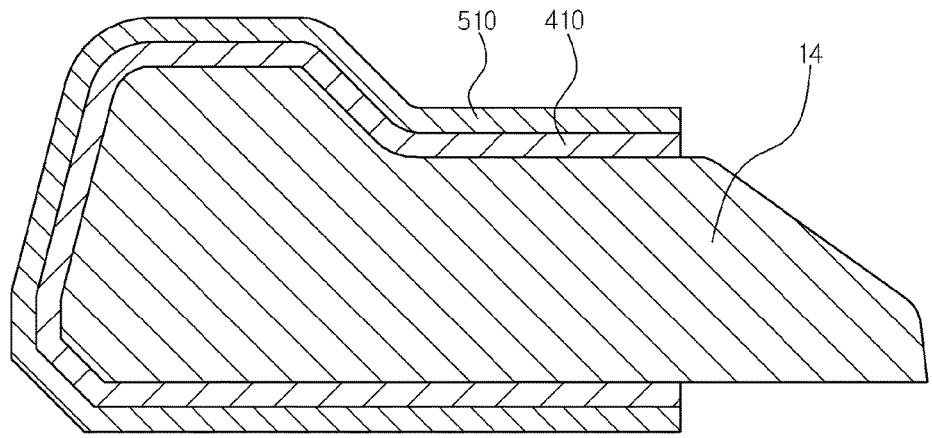
FIG. 6 is a cross-sectional view illustrating a partially peeled ferrule according to an embodiment of the present invention.

FIG. 6 is a cross-sectional view illustrating a partially peeled ferrule according to an embodiment of the present invention.

After completion of the secondary plating step, the plating is removed from the region corresponding to the nose portion 14b. The removal process may be performed by immersing the portion corresponding to the nose portion 14b in a solvent able to dissolve the corresponding metal layer. For example, copper is dissolved in nitric acid, and iron, nickel, chromium or tin may be dissolved in hydrochloric acid, and thus the region corresponding to the nose portion 14b of the secondarily plated back ferrule 14 may be removed by being immersed in hydrochloric acid and nitric acid, in that order, or in a mixture of hydrochloric acid and nitric acid.

Figure 7A:
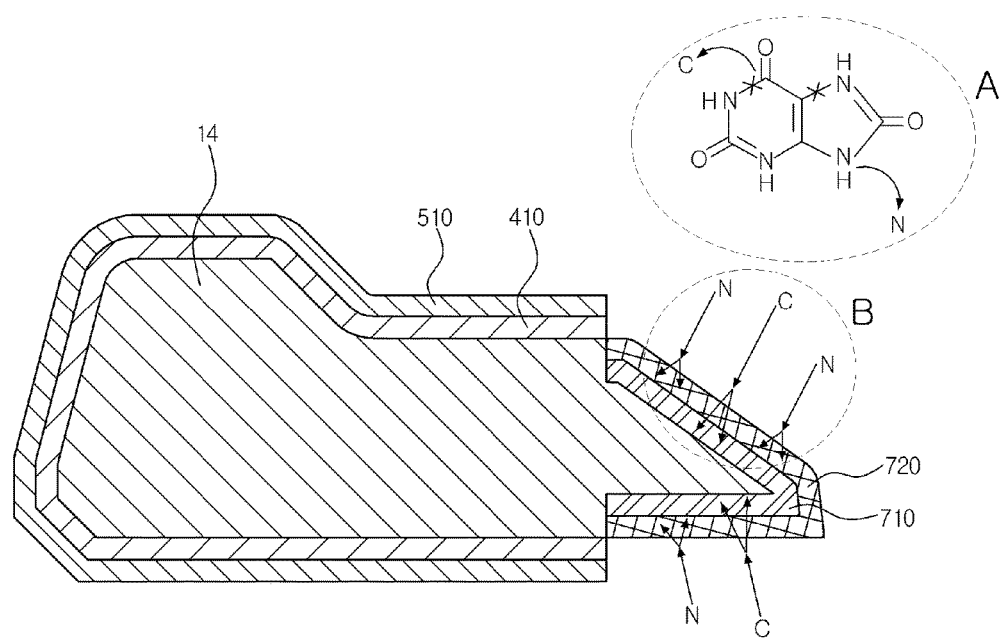
FIGS. 7A and 7B are schematic views illustrating a permeation process upon heat treatment according to an embodiment of the present invention.
Figure 7B:
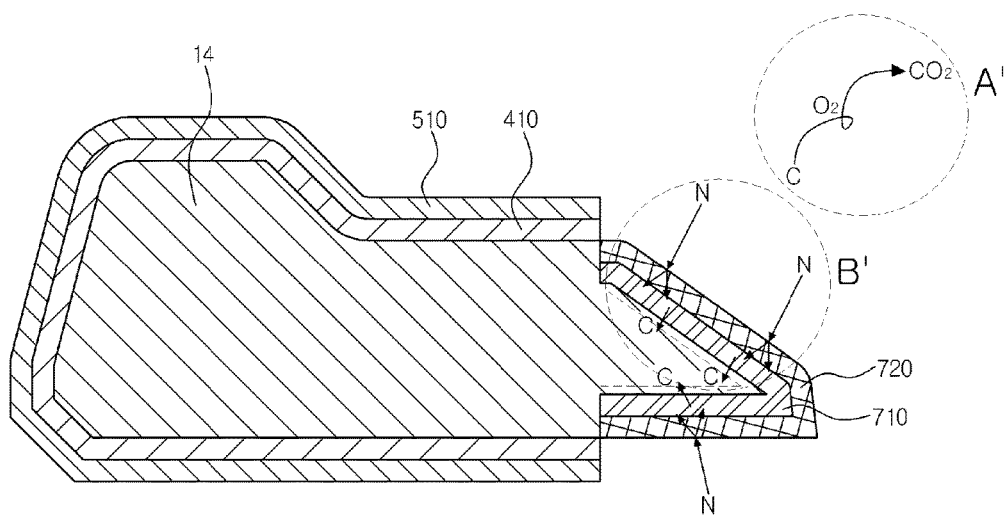

FIGS. 7A and 7B schematically illustrate the extent of penetration in the presence or absence of the plating upon nitriding or carburizing according to an embodiment of the present invention.

FIG. 7A illustrates the reaction between the molten salt solution and the surface of the ferrule in the early stage of heat treatment. The heterocyclic organic compound such as uric acid begins to decompose in the molten salt solution. The heterocyclic organic compound contains nitrogen. When the ring is broken, chemical symmetry may be lost, and stability may decrease and thus the compound is divided into elements. Therefore, the molten salt solution includes carbon, nitrogen and oxygen present in an ionic state.

Also, nitrogen, carbon and oxygen may react on the surface of the ferrule. The external oxide film of chromium-based iron is removed by a molten alkali salt solution, and oxygen does not react or reacts and is thus removed. Then, carbon and nitrogen penetrate into the surface of the ferrule. Since carbon may easily penetrate through the surface compared to nitrogen, carbon penetrates at high density as deep as possible, not the surface portion.

FIG. 7B illustrates the reaction between the molten salt solution and the surface of the ferrule in the mid and late stages of heat treatment. In the molten salt solution, the decomposition of the heterocyclic organic compound such as uric acid begins to be completed. Thus, an additional supply of nitrogen, carbon and oxygen is stopped, except for the previously decomposed nitrogen, carbon and oxygen contained in the molten salt solution. Carbon is combined with oxygen in air and is gasified into carbon dioxide, and ultimately the element remaining in the molten salt solution is nitrogen.

Only nitrogen continuously reacts on the surface of the ferrule, and oxygen may react with carbon present on the surface thus removing carbon. Nitrogen continuously penetrates through the surface of the workpiece. Nitrogen and carbon penetrate in the same space of the atomic structure of iron. As such, a larger amount of nitrogen penetrates, and the previously penetrating carbon is pushed more deeply. Accordingly, the nitrogen layer 720 is formed while the carbon layer 710 is pushed more deeply.

When the heat treatment temperature is high, chromium may be recrystallized by the high temperature treatment alone. Also, nitrogen and carbon are not continuously supplied, and may be removed after having been excessively supplied in the early stage. Thus, the heat treatment temperature is set to the range of 500 to 800° C. When the heat treatment temperature is lowered, the penetration rate of nitrogen or carbon may decrease and the long-term heat treatment may thus be conducted. As such, the heat treatment time may be set to the range from 24 hr to within 48 hr.

Figure 8:
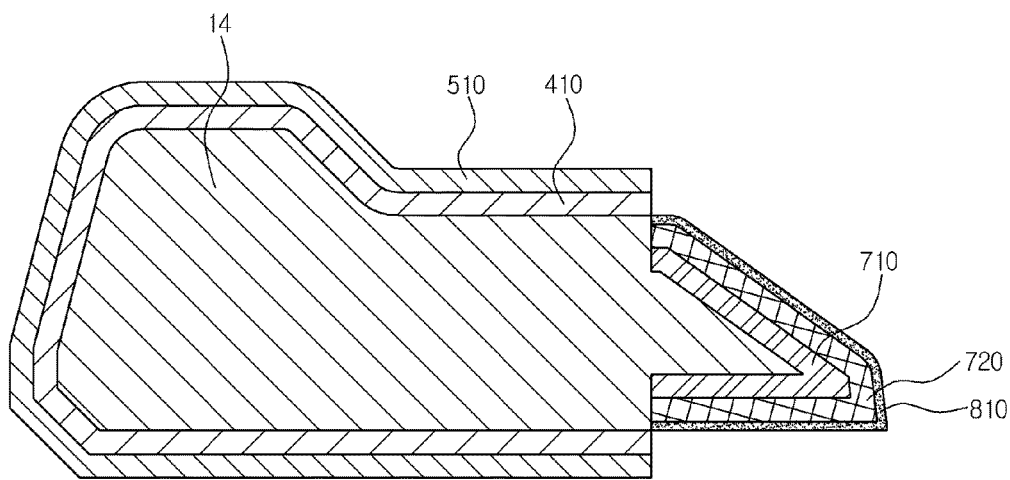
FIG. 8 is a cross-sectional view illustrating a ferrule from which the plating was removed according to an embodiment of the present invention.

FIG. 8 is a cross-sectional view illustrating a ferrule from which the plating was removed according to an embodiment of the present invention.

After completion of the heat treatment, the salt is removed and cooling may be carried out. The second 510 and the first metal layer 410, covering the tail portion 14a, are sequentially dissolved in the solvent and thus removed, thereby obtaining a back ferrule 14 in which only the nose portion 14b is hardened. As such, the nose portion 14b includes a layer structure containing nitrogen and carbon in excessive amounts.

As mentioned with regard to FIGS. 7A and 7B, because the carbon layer 710 is pushed deeply by the nitrogen layer 720, the surface layer 810 containing nitrogen and carbon in excessive amounts, the nitrogen layer 720 containing nitrogen in a larger amount than carbon, and the carbon layer 710 having carbon as a main penetration material are sequentially formed from the surface of the workpiece. The specific thickness of each layer is described later with reference to FIGS. 9A to 9D and 10A and 10B.

As for a metal having corrosion resistance, such as stainless steel, the surface thereof is formed with an oxide film to protect the metal. Thus, the back ferrule 14 or the workpiece has to be free of an oxide film by being immersed in an alkali metal salt or the like immediately before heat treatment. In the heat treatment step, the molten salt solution typically includes an alkali metal, but there is no essential need to use the molten salt solution including an alkali metal salt, so long as the film may be removed via physical peeling or using a reductant instead of the alkali metal. Also, since there is no concentration difference due to the precipitation of chromium even after the heat treatment, chromium on the ferrule is combined with oxygen in air to form an oxide film. Accordingly, corrosion resistance of stainless steel, which prevents continuous corrosion of the exposed iron, may be maintained. Such an oxide film is uniformly formed on the heat treated portion and the portion that was not heat treated.

As mentioned above, the workpiece requiring partial hardening is exemplified by the back ferrule 14. In addition thereto, a front ferrule 13 also needs partial hardening as described in the [Description of the Related Art]. The present invention will be able to be applied to a general ferrule or a workpiece that should have corrosion resistance and high hardness at a specific portion.

FIGS. 9A to 9D and 10A and 10B illustrate the structures and the corrosion resistance of a partially carbonitriding heat treated stainless steel ferrule according to an embodiment of the present invention and a stainless steel ferrule manufactured by a general carburizing process.

FIGS. 9A to 9D are GDS graphs of the partially carbonitriding heat treated stainless steel ferrule according to an embodiment of the present invention, and the stainless steel ferrule that was not heat treated.

Figure 9:
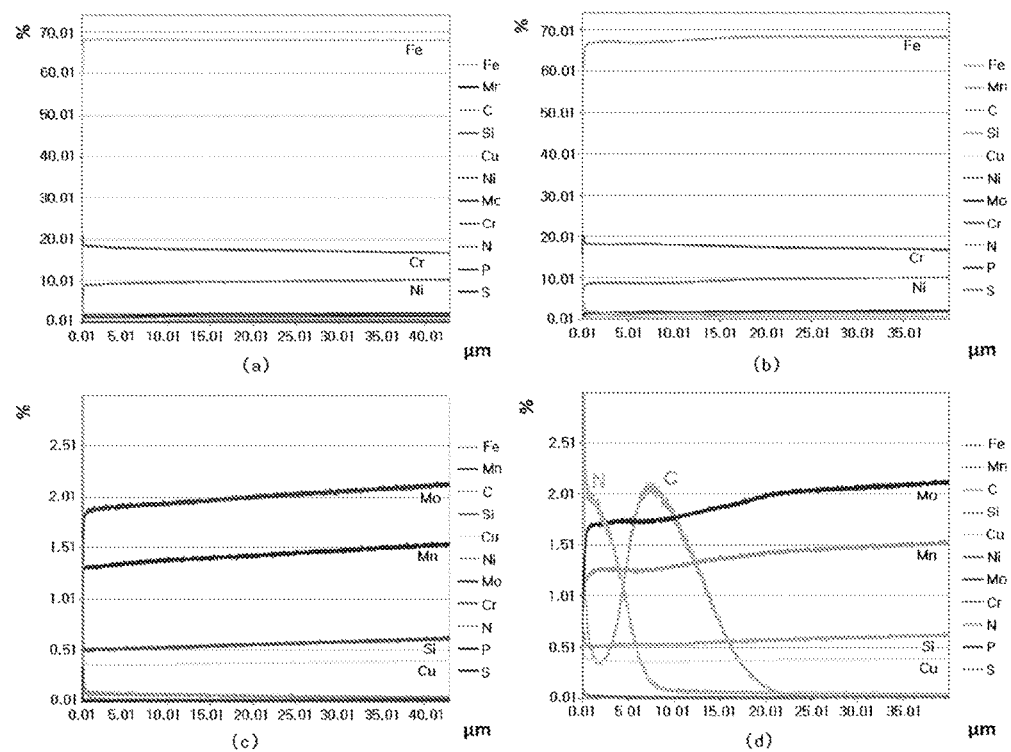
FIG. 9 is GDS graphs illustrating a partially carbonitriding heat treated stainless steel ferrule according to an embodiment of the present invention and a stainless steel ferrule that was not heat treated.

FIG. 9A is a graph of the stainless steel ferrule that was not heat treated, and FIG. 9B is a graph of the partially carbonitriding heat treated stainless steel ferrule.

Although there is almost no difference in the main components in an amount exceeding 10%, nitrogen and carbon within 3% show changes in the composition on the surface of the workpiece.

FIGS. 9C and 9D are GDS graphs of the components of less than 10%. FIG. 9C is a GDS graph of the stainless steel ferrule that was not heat treated, and FIG. 9D is a GDS graph of the partially carbonitriding heat treated stainless steel ferrule.

In FIG. 9D, nitrogen is detected in the region within 7 μm from the surface, unlike in FIG. 9C. Also, carbon is contained in a minimum amount at a position of 2.5 μm from the surface and in a maximum amount at a position of about 10 μm from the surface. As shown in the graphs, nitrogen and carbon have maximum values at different positions. Hence, it can be confirmed that the layer composed mainly of nitrogen and the layer composed mainly of carbon are formed.

Also, the surface layer 810 is detected in the portion within 0.1 μm very close to the surface of the ferrule, which includes both nitrogen and carbon in large amounts. This is because the excess of nitrogen and carbon come into contact with and penetrate to the surface of the ferrule from the outside. The layer containing a large amount of impurities has high hardness because dislocation is not easily transferred.

However, because the amount of impurities is drastically decreased, the surface layer 810 may be easily peeled due to the different structure and properties from the inner layers. The nitrogen layer 720 having high nitrogen content and thus high hardness is provided under the surface layer to thereby prevent peeling of the surface layer 810, and the carbon layer 710 having carbon and thus high strength is provided under the nitrogen layer to thereby prevent breaking of the layer structure.

The carbon layer 710 is preferably formed as deeply as possible because the strength is determined thereby. Thus, heat treatment for 24 hr or longer results in that a large amount of carbon penetrates to the region deeper than 5 μm from the surface to give the carbon layer 710. As such, the carbon layer 710 refers to a layer having carbon content higher than nitrogen content. The carbon layer 710 has maximum carbon content in the region near 10 μm from the surface.

The nitrogen layer 720 functions to prevent a significant increase in a hardness difference between the surface layer and the inner layer to prevent peeling of the surface layer. Accordingly, the nitrogen layer 720 is preferably configured such that nitrogen content gradually decreases from the surface of the workpiece. However, it is easy to form the surface layer 810 having nitrogen and carbon in amounts of greater than 1% because nitrogen and carbon initially penetrate to the surface while forming a nitride and a carbide. Thus, the nitrogen layer 720 is located between the surface layer 810 having nitrogen and carbon in amounts of greater than 1% and the carbon layer 710 having carbon content greater than nitrogen content. The surface layer 810 is formed in the narrow region of 0.005 μm to within 0.1 μm. The nitrogen layer 720 is formed in the region of 0.1 to 10 μm from the surface. Further, the nitrogen concentration of the nitrogen layer 720 decreases in proportion to an increase in the depth from the surface layer 810.

The carbon layer 710 includes a carbide precipitate of chromium, thus causing non-uniformity of chromium to thereby form a galvanic cell. Accordingly, when the carbon layer 710 is exposed to the surface of the workpiece, corrosion resistance may decrease. Thus, the workpiece easily corrodes when electrochemical etching is applied externally. In the present invention, however, the carbon layer 710 is provided inside the workpiece, thus preventing the corrosion resistance from deteriorating. Moreover, because carbon is removed after having been provided at low temperature, chromium is precipitated in a comparatively small amount on the layer formed on the surface, and thus corrosion resistance does not deteriorate.

Figure 10:
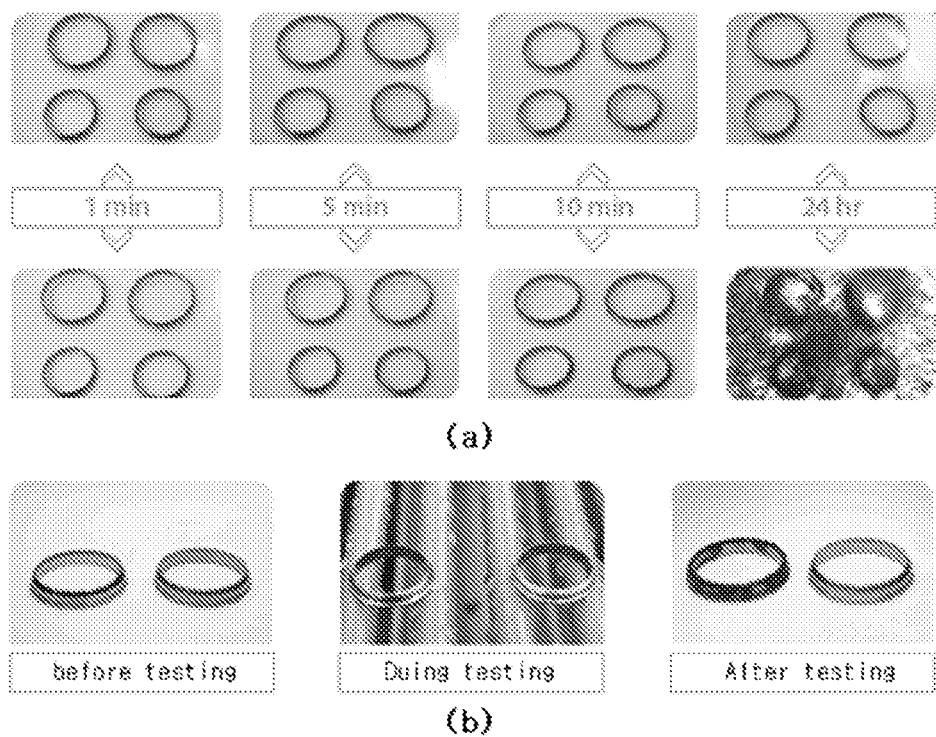
FIG. 10 is photographs illustrating the test results of corrosion resistance of a partially carbonitriding heat treated stainless steel ferrule according to an embodiment of the present invention and a stainless steel ferrule that was not heat treated.

FIGS. 10A and 10B are photographs illustrating the test results of corrosion resistance of a partially carbonitriding heat treated stainless steel ferrule according to an embodiment of the present invention, and a stainless steel ferrule that was not heat treated.

Corrosion resistance was evaluated through accelerated aging testing and salt-spray testing (ASTM F1387-99).

FIG. 10A illustrates the photographs over time upon accelerated aging testing of the stainless steel ferrule that was not heat treated and the heat treated stainless steel ferrule.

The typically carburized stainless steel ferrule and the heat treated stainless steel ferrule were treated with sodium hypochlorite (HClO) and the extent of corrosion thereof was observed with the naked eye over time at room temperature.

As illustrated in these drawings, there was no great difference up to initial 5 min, but the corrosion of the typically carburized stainless steel ferrule was accelerated over time. The corrosion resistance of the partially carbonitriding heat treated stainless steel ferrule did not deteriorate.

FIG. 10B illustrates the photographs of corrosion resistance over time through salt-spray testing.

The simply carburized stainless steel ferrule corroded after 72 hr, but the corrosion resistance of the partially carbonitriding heat treated stainless steel ferrule did not deteriorate.

The heat treated first region had a Vicker's hardness of 600 to 800 hv, which is greatly higher than 200~300 hv which is a hardness of the portion that was not heat treated. The typical stainless strength is maintained as it is in the second region, which is set to 200~300 hv. As only the necessary portion is selectively strengthened in this way, the weak portion absorbs torque and the portion requiring high hardness may be prevented from abrading.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A partially carbonitriding heat treated stainless steel ferrule, having a first region with a first hardness and a second region with a second hardness, wherein the first region comprises:

a surface layer having a thickness of 0.005 to 0.1 μm and nitrogen and carbon concentrations higher than 1 wt % based on a total composition;

a nitrogen layer formed under the surface layer and having a nitrogen concentration higher than a carbon concentration; and a carbon layer formed under the nitrogen layer and having a carbon concentration higher than a nitrogen concentration, wherein the first hardness is greater than the second hardness.

2. The stainless steel ferrule of claim 1, wherein the first region and the second region further comprise a chromium-based oxide film on a surface thereof.

3. The stainless steel ferrule of claim 1, wherein the nitrogen layer has a thickness of 0.1 to 10 μm, and the nitrogen concentration has a maximum value at a surface of the stainless steel ferrule.

4. The stainless steel ferrule of claim 3, wherein the carbon layer is provided at a position deeper than 5 μm from the surface of the stainless steel ferrule.

5. The stainless steel ferrule of claim 4, wherein the carbon layer has a maximum carbon concentration in a region of 5 to 15 μm from the surface of the stainless steel ferrule.

6. The stainless steel ferrule of claim 1, wherein the first hardness is 600 to 800 hv and the second hardness is a general hardness of stainless steel.

7. The stainless steel ferrule of claim 1, wherein the first region is a nose portion.

8. The stainless steel ferrule of claim 1, wherein the stainless steel ferrule is a back ferrule.

* * * * *